Dec. 1, 1959  H. J. STRAUSS  2,915,576
SEALED ALKALINE STORAGE BATTERY
Filed Sept. 10, 1956
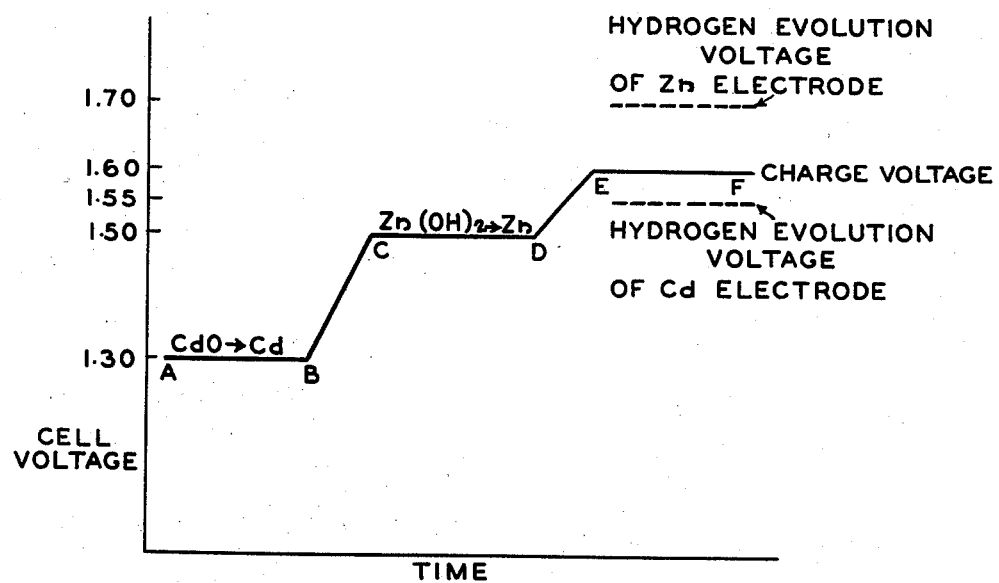
INVENTOR.
HOWARD J. STRAUSS
ATTORNEY

United States Patent Office 2,915,576
Patented Dec. 1, 1959

2,915,576
SEALED ALKALINE STORAGE BATTERY

Howard J. Strauss, Elkins Park, Pa., assignor to The Electric Storage Battery Company, a corporation of New Jersey Application September 10, 1956, Serial No. 608,748

5 Claims. (Cl. 136—9)

The invention relates to sealed alkaline storage batteries of the type containing a nickel oxide and metallic cadmium as the active materials of the positive and negative plates respectively.

In the storage battery field there have been many attempts to produce satisfactory alkaline type batteries that are sealed against the passage of gases either to or from the atmosphere surrounding the battery. A problem with the open type of storage battery, in which the electrolyte is conventionally a solution of potassium hydroxide, has been that the carbon dioxide from the atmosphere contaminates the electrolyte by the formation of deleterious carbonates. Additionally, since the water in the electrolyte is dissassociated into its elemental components i.e. hydrogen and oxygen, under the influence of a charging current, the escape of these gases from the cells results in depletion of the electrolyte whereby extensive servicing and maintenance is required. A further factor making it desirable to produce sealed storage batteries is the fact that oxygen from the atmosphere tends to convert the metallic cadmium in the negative plate to its discharged form i.e. cadmium oxide thereby causing loss of electrical capacity.

The chief difficulty to be overcome in the successful production of a sealed storage battery is the build up of gas pressure within the container during the life of the battery, this gas pressure consisting of the partial pressures of the hydrogen and oxygen derived from electrolytic disassociation of electrolyte. Whereas, on one hand, the oxygen is quite readily reduced upon the metallic cadmium of the negative plate, the reaction between the hydrogen and the active material of the positive plate, generally felt to be one of the higher oxides of nickel, is relatively slow and results in a steadily increasing hydrogen pressure which will eventually reach the point at which the container will be disrupted.

Since storage batteries generally comprise a plurality of cells, and also since a number of batteries may be used in series for specific purposes, it is conventional practice to subject the batteries to a period of overcharge to insure that the weaker cells or batteries are completely recharged at the end of that phase of the discharge-charge cycle. During this period of overcharge it has been determined in the past that oxygen is evolved at the positive plate (anode) and hydrogen is evolved at the negative plate (cathode). By reason of this fact, it has been sought to overcome the hydrogen evolution problem by giving the negative plates a sufficient excess of uncharged negative active material when compared to the active material of the positive plates so that the positive plates will become charged and go into overcharge before the negatives become completely charged. The theory behind this type of construction is that the oxygen evolved at the positive plates will react with the metallic cadmium already formed on the negative plates thereby setting up a dynamic balance i.e. the tendency of the oxygen to convert the metallic cadmium to cadmium oxide will exactly counterbalance the conversion of cadmium oxide to metallic cadmium by the charging current. Accordingly, the negative plates will not reach a state of full charge and, therefore, hydrogen will not be evolved as the plates will never go into overcharge. Although this construction has been satisfactory in sealed cells for certain purposes, it has been found that during the life of an alkaline battery the cadmium negative plate tends to lose capacity and, therefore, for batteries designed to give a long useful life the point will be reached at which the negatives will go into overcharge and hydrogen will be evolved, thereby building up dangerous pressures long prior to failure of any of the other componets of the battery A reaction similar to that discussed above with respect to the charge of a battery occurs during discharge. During that phase of the cycle, the weaker cells or batteries may reach the end of discharge while the remainder of the cells or batteries can still deliver useful energy. In that situation the former will go into reversal i.e. overdischarge, during which hydrogen will be evolved at the positive plate (now acting as a cathode) and oxygen will be evolved at the negative plate (now acting as an anode). To counteract this it has already been suggested to supply an excess of charged positive active material so that the negative plates will go into reversal thereby evolving oxygen and establishing the same dynamic balance discussed above prior to complete discharge of the positive plates. The problem of reversal can, however, be more readily controlled and, hence, is of secondary importance to the problem of overcharge.

Accordingly, to produce a satisfactory sealed alkaline type battery it is necessary primarily to suppress the evolution of hydrogen which occurs upon overcharge. Particularly is this true in the case of batteries of the long life type which are destined not for cycle service but for standby purposes during which a trickle charge is or may be constantly passed through the battery to supply the losses resulting from local action thereby maintaining the battery in a fully charged condition at all times. These batteries are of the type that may be used as the auxiliary power sources for emergency lighting systems, telephone equipment and the like. It is a feature of the manner in which these batteries are used that the so-called trickle charge is supplied at a steady voltage.

It is an object of the invention, therefore, to provide a sealed storage battery of the alkaline type that is so constructed that the evolution of hydrogen gas will be completely suppressed.

Figure 1 is a schematic diagram showing the functioning of the invention.

The invention comprises the addition to the alkaline electrolyte, generally a solution of about 30% potassium hydroxide, of a metallic substance that is readily soluble in said electrolyte but can also be plated out upon the negative plate under the influence of the charging current. For example, zinc oxide, zinc hydroxide and metallic zinc are extremely useful to produce the desired results that will hereinafter be discussed.

By reference to the drawing it will be seen that the conversion of cadmium oxide to metallic cadmium occurs with a charge voltage of approximately 1.30 volts. In other words, by supplying a charging current at such voltage the negative plate will become completely converted from the discharged condition i.e. cadmium oxide, to the charged condition i.e. metallic cadmium, the period of time involved being, of course, dependent upon the amount of current supplied. This electrolytic conversion occurs between points A and B shown in the drawing. At point B the negative plates of the cell with which we are concerned are completely charged. Since the charge is continued to insure the complete charge of other cells or batteries in the string, or since a trickle charge is being supplied to the battery, the cell goes into overcharge, a condition which would normally evolve hydrogen at the negative plates. Since, however, the plating of zinc on the negative plate occurs at a voltage less than that required for the evolution of hydrogen the plating reaction is established preferential to the gas evolution reaction. In the drawing this is shown as occurring at a voltage of about 1.50 volts and between the points C and D. The charge voltage at the termination of charge is about 1.60 volts and is indicated by the line E—F.

At point D the surface of the negative plate is now completely covered with metallic zinc with the result that the negative plates become, for present purposes, zinc electrodes as compared with their conventional function as cadmium electrodes. As will be seen in the drawing the hydrogen evolution voltage i.e. the cell voltage at which hydrogen will be evolved when the negative is a true cadmium electrode is about 1.55 volts. The invention is based upon the fact that the hydrogen evolution voltage when the negative is covered with zinc is 1.70 volts and, it will be noted, that this is substantially higher than the cell voltage at which hydrogen will be evolved on a normal cadmium electrode and also higher than the maximum voltage of the current being supplied to the cell. By reason of this fact, if the charge voltage is controlled so as to vary only within the range of 1.30 volts and 1.70 volts, the minimum being that necessary to convert the cadmium oxide to metallic cadmium and the maximum being below the hydrogen overvoltage of a zinc electrode, the latter point will not be reached and, therefore, hydrogen gas will never be evolved during charging.

To produce the desired result it is only necessary that a sufficient quantity of the metallic zinc, zinc oxide, or zinc hydroxide be added to the electrolyte, which substances will exist therein as zinc hydroxide, $Zn(OH)_2$, so that a mono-molecular layer of metallic zinc will be plated out upon the surface of the negative plate. This amount is sufficient to produce the desired result of causing the negatives to perform as zinc electrodes insofar as the hydrogen overvoltage is concerned and is between about .0001 gram and .001 gram of zinc per square inch of negative plate surface, and preferably about .0005 gram per square inch of negative plate surface.

Accordingly, it will be seen that I have achieved the objects of my invention, namely, to provide a sealed storage battery of the alkaline type in which the evolution of undesirable hydrogen gas will be completely suppressed.

I claim:

1. In a sealed storage battery of the nickel-cadmium type having an alkaline electrolyte, the improvement which consists of the presence in said electrolyte of zinc hydroxide in an amount sufficient to provide a metallic coating over the entire surface of the negative plate of at least mono-molecular thickness, said coating density not exceeding 0.001 gram of metallic zinc per square inch of negative plate surface.

2. The sealed storage battery of claim 1 in which the amount of zinc hydroxide is sufficient to provide about 0.0005 gram of metallic zinc per square inch of negative plate surface.

3. A method of suppressing the evolution of hydrogen gas in a sealed storage battery of the nickel-cadmium type which comprises the steps of adding to the alkaline electrolyte of said battery a substance selected from the group consisting of metallic zinc, zinc oxide, and zinc hydroxide, sealing said battery, and thereafter maintaining the charge voltage within the range of 1.30 volts to 1.70 volts, said substance being added in such an amount as to provide a metallic coating over the entire surface of the negative plate of at least mono-molecular thickness, said coating density not exceeding 0.001 gram of metallic zinc per square inch of negative plate surface.

4. A method of suppressing the evolution of hydrogen gas in a sealed storage battery of the nickel-cadmium type which comprises the steps of adding to the alkaline electrolyte of said battery a substance selected from the group consisting of metallic zinc, zinc oxide, and zinc hydroxide, sealing said battery, and thereafter maintaining the charge voltage within the range of about 1.30 volts to 1.70 volts so that the cadmium electrode is first completely converted from cadmium oxide to metallic cadmium and thereafter plated with at least a mono-molecular layer of metallic zinc as the charge voltage increases within said range whereby the negative electrode will perform as a zinc electrode insofar as the evolution of hydrogen gas is concerned, said coating density not exceeding 0.001 gram of metallic zinc per square inch of negative plate surface.

5. A sealed storage battery comprising a nickel anode, a cadmium cathode and an alkaline electrolyte, said electrolyte including an amount of zinc hydroxide sufficient to provide a metallic coating on said cadmium cathode of at least a mono-molecular layer of metallic zinc after said battery has been charged to a cell voltage above 1.30 volts and below 1.70 volts whereby said battery may be charged to a voltage higher than the hydrogen evolution voltage of said cadmium cathode, said coating density not exceeding 0.001 gram of metallic zinc per square inch of negative plate surface.

References Cited in the file of this patent

UNITED STATES PATENTS

| 1,624,845 | Nyberg | Apr. 12, 1927 |
| 2,611,792 | Andre | Sept. 23, 1952 |
| 2,662,928 | Brennan | Dec. 15, 1953 |
| 2,714,624 | Sayas Costa et al. | Aug. 2, 1955 |

OTHER REFERENCES

Lange, N. A., "Handbook of Chemistry," Handbook Publishers, Inc., Sandusky, Ohio, 1949, ed. 7, page 1106.